United States Patent

Clauss, Jr.

[15] 3,664,206
[45] May 23, 1972

[54] ACCESSORY DRIVE MECHANISM

[72] Inventor: Julius A. Clauss, Jr., Birmingham, Mich.
[73] Assignee: Borg-Warner Corporation, Chicago, Ill.
[22] Filed: June 25, 1970
[21] Appl. No.: 49,795

[52] U.S. Cl. .................................................74/230.17 E
[51] Int. Cl. ...........................................F16h 55/22
[58] Field of Search..........................................74/230.17 E

[56] References Cited

UNITED STATES PATENTS

| | | | |
|---|---|---|---|
| 2,678,566 | 5/1954 | Oehrli | 74/230.17 E |
| 2,986,043 | 5/1961 | Jaulmes | 74/230.17 E |
| 2,987,934 | 6/1961 | Thomas | 74/230.17 E |
| 2,715,842 | 8/1955 | Homuth | 74/230.17 E |

FOREIGN PATENTS OR APPLICATIONS 1,121,165   4/1956   France ..........................74/230.17 E Primary Examiner—Leonard H. Gerin
Attorney—Donald W. Banner, William S. McCurry and John W. Butcher

[57] ABSTRACT

A drive mechanism for driving accessories, associated with a prime mover such as an automotive engine which is normally operated over a wide range of speeds, and operable to increase the speed of the accessories at lower engine speeds to increase their output and to reduce the speed of the accessories at high engine speeds. The drive mechanism is a speed-responsive variable ratio V-belt pulley assembly with expanding driving and driven pulleys, each pulley having truncated conical discs defining a V-belt groove and movable toward each other by spring force, the drive pulley being rotatable by the engine and provided with cam ramps disposed radially inward of its groove and engaging balls movable by centrifugal force to separate its discs to vary the effective diameters of the V-belt grooves.

9 Claims, 2 Drawing Figures

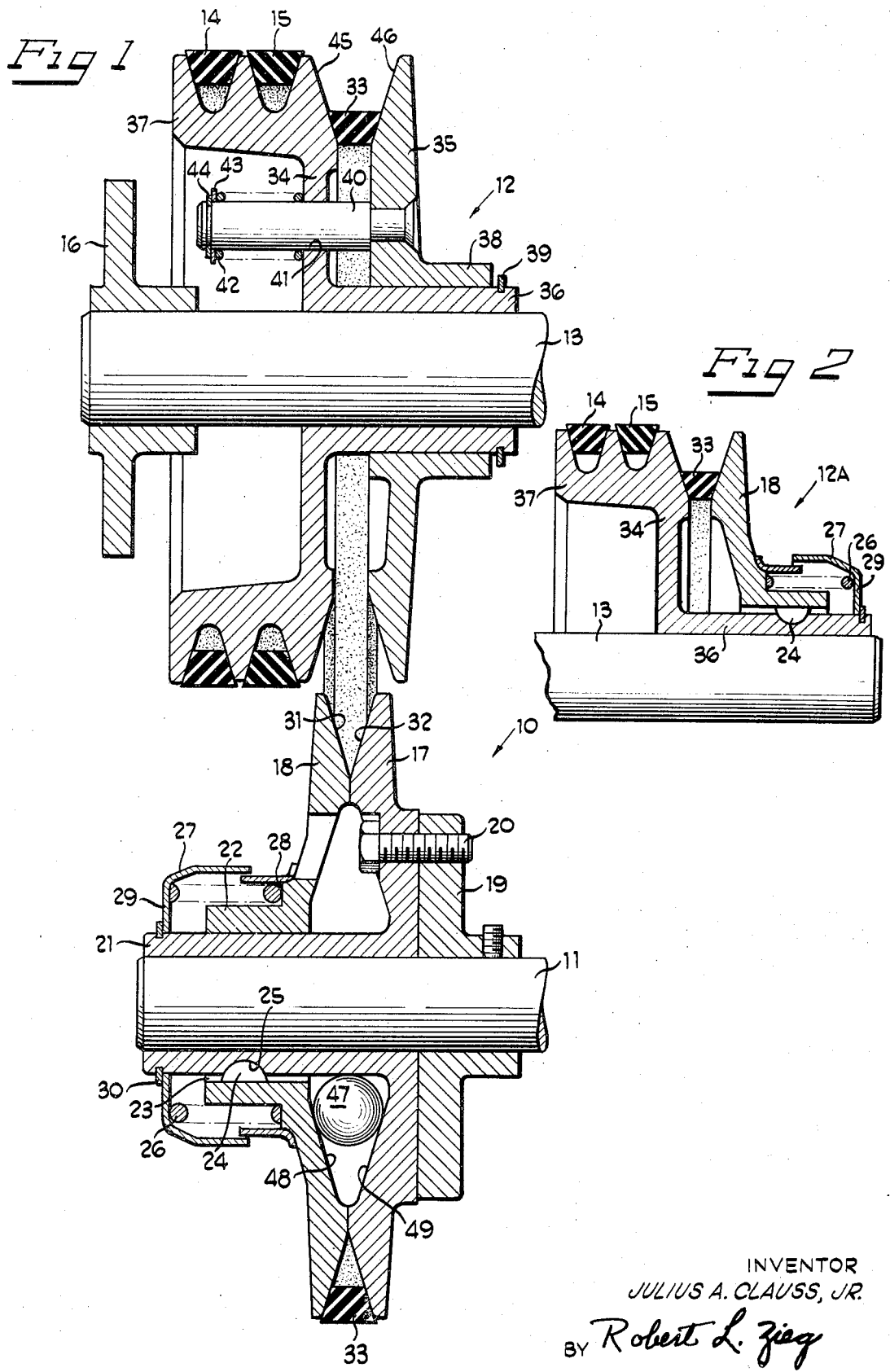

ACCESSORY DRIVE MECHANISM

BACKGROUND AND SUMMARY OF THE INVENTION

Many different constant speed mechanisms, such as a water pump, air conditioner compressor, electric generator, fan, and power steering pump, are employed as for example with an automotive engine accessories. As automotive internal combustion engines or prime movers drive these accessories but operate at constantly changing speeds, it would be desirable to employ speed regulating devices between the engine and accessories to automatically operate to convert the engine variable speed to a sufficiently constant speed to satisfactorily drive the accessories. One type of prior art speed regulating device is a V-belt pulley assembly having a V-belt engaging expandible drive and driven pulleys of oppositely variable radii, and speed-responsive means operating to automatically vary the radii.

One problem encountered in the employment of such V-belt pulley assembly is that its automatic speed-responsive means causes the assembly to have an axial dimension making the assembly difficult or impractical to position in the limited space which may be available. Another problem of such pulley assembly is the speed-responsive means is associated with one of the pulleys and located at one side of the central axis of the pulley; or, if the speed-responsive means is positioned in a plane intersecting the pulley's central axis, it is displaced axially to one side of the pulley during operation, so that, in either case, an out-of-balance condition occurs in which the truncated conical V-belt engaging discs and their components of the pulley assembly are subject to strain and can be distorted or deformed in the transmission and conversion of the fluctuating engine speeds to provide constant speed actuation of the accessories.

The present invention proposes to solve these problems by providing a V-belt pulley assembly including expandible drive and driven pulleys each having spring-loaded discs having conical surfaces defining a V-groove, the drive pulley including speed-responsive means affording an axially compact balanced construction of the pulley and provided by symmetrically arranged cam ramps on the discs disposed radially inwardly of the V-groove and engaging balls movable by centrifugal force radially along the central axis of the pulley to separate the discs to vary the effective diameters of the V-belt grooves.

Accordingly, it is an object of this invention to provide an improved compact drive mechanism adaptable for use in driving accessories at a constant speed from a variable speed power source.

Another object of the invention is to provide an improved drive mechanism including a V-belt drive pulley assembly having a speed-responsive variable ratio device automatically operative to increase the speed of engine-driven accessories during engine idling to thereby increase their output and to reduce the speed of the accessories at high engine speeds when their output is more than adequate.

Another object of the invention is to provide an improved variable speed drive mechanism having driving and driven pulleys each comprising separable discs spring-loaded to define a V-belt groove, with the drive pulley discs being formed with cam surfaces engaging balls movable radially along a central axis of the pulley in response to a variable speed power source to automatically vary the speed ratio between the driving and driven pulleys as a function of speed of the power source.

Another object of the invention is to provide an improved V-belt drive pulley assembly having separable discs defining a V-belt groove, and speed-responsive means operable to separate the discs to vary the effective diameter of the groove and being disposed between the discs and movable radially along an axis central of the pulley thus providing an axially compact and balanced pulley structure.

Additional objects and advantages will become apparent from the following description taken in conjunction with the drawings which:

DESCRIPTION OF THE DRAWINGS

FIG. 1 is a vertical sectional view taken through the improved accessory drive mechanism including the driving and driven pulleys, and the speed-responsive operating and control means for the driving pulley.

FIG. 2 is a vertical sectional view of the upper half of a modification of the driven pulley shown in FIG. 1.

DESCRIPTION OF THE PREFERRED EMBODIMENT

Referring to the drawing, the improved accessory drive mechanism is shown in its preferred embodiment, as a pulley assembly including a drive pulley 10 connected to a variable speed shaft 11 such as the drive shaft or crankshaft of an internal combustion engine, and to a driven pulley 12. The driven pulley 12 is drivingly connected to a shaft or idler post and belts 14 and 15 providing constant speed drives to the accessories. In one example, one end of the shaft 13 may drive a fan through a press-fit connection to its hub 16, and the other end of the shaft 13 drives a water pump (not shown). The belts 14 and 15 are connected to other pulleys drivingly connected to accessories, such as an air conditioner compressor, and electric generator, or the like.

The drive pulley 10 comprises the sections or halves in the form of discs 17 and 18. The disc 17 is drivingly connected to a damper plate 19 fixed to the shaft 11 by a bolt 20 extending through the member 17 and threaded into the plate 19 so that the disc 17 rotates with the engine-driven shaft 11. The disc 17 has a cylindrical sleeve or hub 21 surrounding the shaft 11 and engaging a collar 22 of disc 18 for slidably mounting the disc 18 for movement axially of the shaft 11 toward and from the disc 17. To prevent rotary movement of disc 18 relative to the disc 17, the disc 18 is keyed to disc 17, the inner cylindrical surface of collar 22 of disc 18 being provided with a channel 23 receiving a key 24 positioned in a recess 25 in sleeve 21 of disc 17. A compression spring 26 is in a housing 27 and its coils surround and engage the collar 22 of disc 18, one end of the spring being seated against a shoulder 28 on the disc 18 and the other end of the spring engaging an end wall 29 of the housing. A retaining ring 30 is positioned within a groove in sleeve 21 and engages housing wall 29 to maintain the spring and housing on the sleeve 21. The spring 26 is operative to exert force on the disc 18 to move the disc 18 toward the disc 17 and, when the engine is idling, to engage the disc 17. The discs 17 and 18 are provided with facing conical surfaces 31 and 32 providing a V-groove receiving a V-belt 33 which forms an operative or driving connection between the pulleys 10 and 12.

Referring now to the driven pulley 12, the pulley 12 comprises the halves or sections 34 and 35 which are in the form of discs. The disc 34 is secured to and drives the shaft 13 by press-fitting a cylindrical sleeve or hub 36 of the disc on the shaft. The disc 34 has a bell-shaped portion 37 provided with V-grooves for the accessory drive belts 14 and 15. The disc 35 has a collar 38 surrounding the sleeve 36 of disc 34 and slidably mounting the disc 35 on disc 34 for movement of disc 35 axially of shaft 13. A retaining ring 39 is positioned within an annular groove in disc hub 36 to hold the discs 34 and 35 together. The discs 34 and 35 are connected together for conjoint rotation by a plurality of axially extending pins 40 fixed to disc 35 and projecting slidably into a plurality of openings 41 in disc 34. The pins 40 also extend into the bell-shaped portion 37 of the disc 34 and through the coils of a plurality of compression springs 42, which have one end seated against the disc 34 and their other end bearing against washers 43 which engage keeper rings 44 positioned within a groove in the pins 40. The spring arrangement is thus operative to urge the discs 34 and 35 toward each other. The discs 34 and 35 have facing conical surfaces 45 and 46 providing a V-groove receiving the V-belt 33. When the engine is in its idling condition, the V-belt and discs 34 and 35 are disposed in the positions shown in FIG. 1.

An important feature of the present invention is the provision of means responsive to variations in the speed of the prime mover to automatically change the speed ratio between the driving and driven pulleys 10 and 12 by varying the effective diameters of the V-belt grooves. This speed-responsive variable ratio V-belt drive is provided by weights in the form of balls, one of which is shown at 47, positioned between the discs 17 and 18 of the drive pulley 10 and disposed radially inwardly of the V-groove defined by these discs. The discs 17 and 18 are provided with ball-receiving pockets having a plurality of circumferentially spaced pairs of angularly arranged facing surfaces 48 and 49 converging radially outwardly of the axis of the pulley with each pair providing cam ramps engaging a ball 47, the ball seating against the cylindrical sleeve 21 of disc 17 when the discs are engaged by the spring 26.

FIG. 2 illustrates a modification of the driven pulley shown in FIG. 1 and, more particularly, discloses that the drive pulley disc 18 and its spring-actuating mechanism 26, 27 and 28 of FIG. 1 is capable of being substituted for the driven pulley disc 35 and its spring-actuating mechanism 40, 42, 43, 44 of FIG. 1. This versatility in adaptation by employing identical pulley discs and spring-operating mechanisms in both the drive and driven pulleys provides savings in manufacturing costs, storage facilities, and assembly labor costs.

OPERATION

In the operation of the accessory drive mechanism of the present invention, let it be assumed the prime mover or engine is idling and the components of the drive mechanism are disposed in the positions shown in the drawing. The springs 26 and 42 on the pulleys 10 and 12 are designed so that, at engine idling speed, the discs 17 and 18 of pulley 10 are engaged so that the pulley 10 is in closed position with the V-belt at maximum radius, and the discs 34 and 35 are so spaced by the V-belt being at its minimum radius as to place the driven pulley in its open position. At this time, the driven pulley 12 is rotating at a speed greater than engine speed. As engine speed increases, the centrifugal force of the balls 47 increases and the balls forcibly move radially outwardly along the central axis of the drive pulley and along the cam ramps 48 and 49 of the discs 17 and 18 to overcome the force of the spring 26 and spread the discs 17 and 18. As the driving pulley discs separate, the tension on the V-belt is relaxed, and the force of spring 42 on the discs 34 and 35 of driven pulley 12 will cause the discs 34 and 35 to move toward each other and thereby the driven pulley toward closed position to maintain or re-establish tension of belt 33. This action results in a change in speed ratio as the effective diameter of the driving pulley 10 becomes smaller and the effective diameter of the driven pulley becomes larger. At maximum engine speed, the discs 17 and 18 of the driving pulley 10 are in the open position with the belt 33 at minimum radius, and the driven pulley is closed with the belt 33 at maximum radius, so that the driven pulley rotates at a speed slower than engine speed. Thus, the improved accessory drive mechanism automatically changes speed ratio as a function of engine speed. The rate of change of speed ratio is a function of engine speed, driven pulley spring force, drive pulley spring force, drive pulley ball weights, and cam ramp contour. Within limits, these parameters can be changed to vary speed ratio in relation to engine speed.

It is apparent that the improved speed-responsive variable ratio V-belt drive mechanism is particularly designed for accessory drive applications and has for its purpose to increase the speed of the engine-driven accessories at engine idling speed thereby increasing the output of the accessories, and to reduce the speed of the accessories at high engine speed when the output of the accessories is more than adequate. Reducing accessory speed results in lower power requirements and reduced noise level. Also, reliability of the driven accessories is improved, the accessories may be reduced in size with attendant lower costs.

Various features of the invention have been particularly shown and described; however, it should be obvious to one skilled in the art that modifications may be made therein without departing from the scope of the invention.

What is claimed is:

1. A variable speed drive for operatively inter-connecting a driving shaft and a power transmission V-belt and including a pulley having:

first and second sections provided with facing conical surfaces engaging said V-belt, the first section being fixed relative to said shaft for rotation therewith and said second section being axially shiftably mounted on said shaft relative to said first section to vary the effective diameter of the two sections with respect to engagement of said V-belt; a central radial axis being defined between said sections at any relative axial positions of said sections;

spring means operative to urge said sections into engagement with said V-belt; and actuating means positioned between said sections and responsive to the speed of said driving shaft to move radially along said central radial axis for automatically shifting said second section axially of said driving shaft to vary the effective diameter of the sections.

2. A variable speed drive as defined in claim 1 in which said speed-responsive actuating means is disposed radially inwardly of said conical V-belt engaging surfaces of said sections.

3. A variable speed drive as defined in claim 2 in which said speed-responsive actuating means include centrifugal means engaging said sections and moved radially along said central radial axis in an outward direction by accelerated rotation of said driving shaft for automatically shifting said second section axially of said driving shaft.

4. A variable speed drive as defined in claim 1 in which said speed-responsive actuating means include a cam surface on one of said sections and facing the other of said sections, and a centrifugally-operated ball engaging said cam surface and said facing section and operative, in response to increasing and decreasing rotative speed of said driving shaft to shift said second section axially of said driving shaft.

5. A variable speed drive as defined in claim 4 in which said speed-responsive actuating means includes a cam surface on said other section and disposed radially inwardly of said conical surfaces of said sections.

6. A variable speed drive as defined in claim 5 in which pockets are formed by said sections for receiving said balls, and the walls of said pockets provide said cam surfaces.

7. A variable speed drive as defined in claim 5 in which said cam surfaces on said sections converge radially outwardly and toward the central axis of said pulley.

8. A variable speed drive as defined in claim 5 in which said cam surfaces on said sections converge radially outwardly, and said conical surfaces on said sections converge radially inwardly, toward a common plane intersecting the axis of said driving shaft.

9. A variable speed drive comprising:

a driving pulley and a driven pulley each including halves provided with facing conical surfaces;

a driving shaft mounting said halves of said driving pulley for unitary rotation with one of said halves fixed to said driving shaft and the other of said halves being axially shiftable on said driving shaft to vary the effective diameter of the driving pulley; said halves of said driving pulley defining a central radial axis at any relative axial position of said sections;

a driven shaft mounting said halves of said driven pulley for unitary rotation with one of said halves being fixed to said driven shaft and the other of said halves being axially shiftable on said driving shaft to vary the effective diameter of the driving pulley;

a belt engaging the conical surfaces of said pulleys;

resilient means operative to urge said halves of said driving and driven pulleys toward each other and into engagement with said belt; and means responsive to the speed of rotation of said driving shaft and positioned between said halves of said driving pulley and operative to move radially outwardly along said central radial axis to move said halves axially apart to vary the effective diameter of said driving pulley.

* * * * *